Jan. 31, 1961  W. GLASER ET AL  2,970,021
DEVICE FOR SEALING RELATIVELY MOVABLE MACHINE PARTS
Filed June 16, 1958
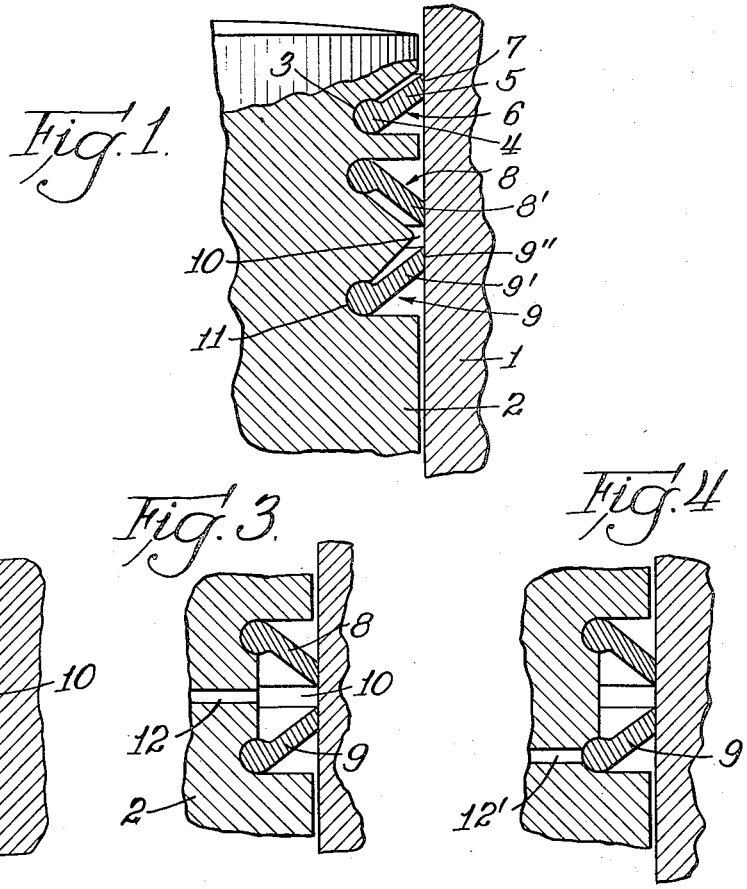
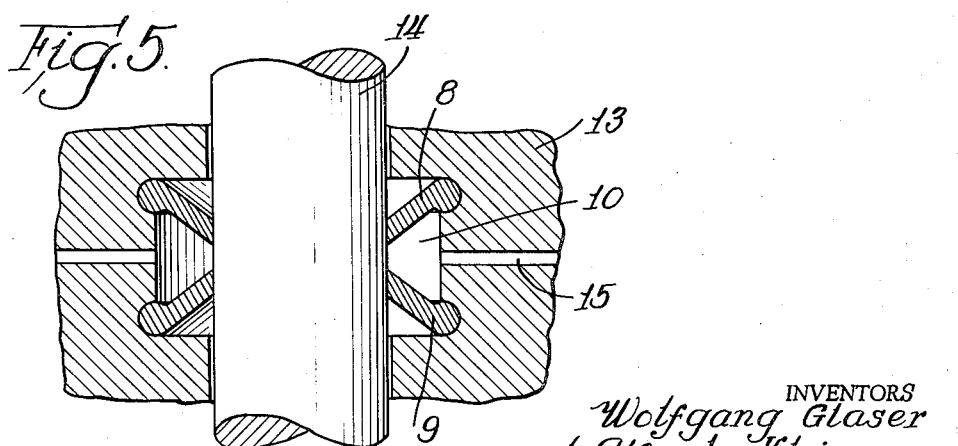
INVENTORS
Wolfgang Glaser
and Alfred Kleissmann
Att'y.

2,970,021

DEVICE FOR SEALING RELATIVELY MOVABLE MACHINE PARTS

Wolfgang Glaser and Alfred Kleissmann, Burscheid, Germany, assignors to Goetzewerke Friedrich Goetze Aktiengesellschaft, Burscheid, near Koln, Germany, a German corporation Filed June 16, 1958, Ser. No. 742,252

Claims priority, application Germany July 1, 1957

8 Claims. (Cl. 309—33)

This invention relates to a device for sealing relatively movable machine parts and is particularly concerned with the sealing of pistons.

It is known in connection with sealing reciprocating machine parts, particularly pistons of internal combustion engines, to use compression rings, socalled torsion rings, comprising a bulbous rear portion and an angularly extending sealing or compression web which is affected by oil or gas pressure. The advantage of such torsion rings, as compared with customary piston rings is, that they are responsive to pressure acting upon the webs thereof elastically torsionally deformed throughout the entire cross sectional extent thereof, thereby rotating about their bulbous rear portions which are journalled in annular grooves of corresponding configuration, such grooves being formed in the piston. In accordance with the prior proposal, such torsion rings are disposed so that the angularly extending web faces the space to be sealed, for example, the combustion chamber.

It has also been proposed to use one or more torsion rings with their sealing webs facing the crankcase, for wiping the oil. In case of viscous, cold oil, the oil collecting upon downward motion of the piston underneath the web of the torsion ring, will generally suffice for pressing the gliding surface of the web sufficiently against the cylinder wall. However, due to heating of the oil, especially in case of structurally viscous oils employed at the present time, the viscosity is with high gliding speed considerably reduced. The easily flowing oil can then penetrate through the extremely narrow tightening gap and flows past the lower wiping ring of the piston to the piston ring proper which tightens against the combustion chamber. Even with the slightest formation of an oil wedge between the gliding surfaces and the cylinder wall, the tightening web of the piston ring will be lifted off from the cylinder wall and amounts of oil will reach the combustion chamber. Accordingly, the use of torsion rings as previously proposed will result in considerable oil consumption.

The object of the invention is to provide a sealing for reciprocable machine parts or for cylindrical machine parts arranged for rotation one with respect to the other, especially for pistons, comprising torsion rings disposed in novel manner, thereby avoiding the above indicated drawbacks and respectively wiping the oil and confining it with sufficient reliability.

According to the invention, this object is realized by the provision of a sealing chamber which is formed by two spaced apart torsion rings with their sealing webs facing one another.

Upon disposal of such a sealing chamber, in connection with a piston, underneath the gas-pressure sealing ring, the chamber will receive the oil flowing past its lower torsion ring during the suction and compression stroke of the piston. The progressive filling of the sealing chamber, with oil, will produce auxiliary pressure on the upper torsion ring thereof, pressing its sealing web against the cylinder wall. This will as a rule continue until a certain equilibrium is reached, when the lower torsion ring of the sealing chamber is likewise firmly pressed against the cylinder wall, causing cessation of the pumping action of the sealing chamber. Further oil is thereby securely kept from the upper torsion ring system disposed on the piston which provides for the proper sealing.

The foregoing and other objects and features of the invention will appear from the description which is rendered below with reference to the accompanying drawing showing embodiments thereof in fractional sectional views.

Fig. 1 shows a piston which is reciprocable within a cylinder and comprises an upper sealing ring proper and two torsion rings disposed underneath thereof and forming a sealing chamber according to the invention;

Fig. 2 shows torsion rings forming a sealing chamber to aid in explaining that increased size thereof will permit correspondingly increased deposit of oil therein;

Fig. 3 shows a sealing chamber having relatively small bores formed for expelling oil;

Fig. 4 shows an embodiment in which the oil discharge bores are disposed alongside the bulbous rear part of one of the torsion rings; and Fig. 5 shows an embodiment employing torsion rings for operatively coupling machine parts.

In Fig. 1, numeral 1 indicates a cylinder enclosing a reciprocable piston 2. The piston 2 is provided with an annular groove 3 formed therein in the upper part thereof, a sealing torsion ring 6 provided which has a bulbous rear portion journalled in the groove 3 and an angularly extending sealing web 5, such torsion ring tightening the structure against the combustion chamber lying above the piston. The torsion ring 6 effects the sealing by the action of gas pressure on its sealing web 5, causing elastic deformation thereof over its entire extent, with coincident rotation within the groove 3 and consequent pressure sealing engagement of its end 7 with the cylinder wall.

In accordance with the invention, two further torsion rings 8 and 9 are provided underneath the sealing ring proper, indicated at 6, the angularly extending sealing webs 8', 9' of such further torsion rings being inclined toward each other and defining a sealing chamber 10. During the suction and compression strokes of the piston 2, the oil which is present between the piston and the wall of the cylinder 1 enter the chamber 10 since an oil wedge is formed, during the operation of the piston, in back of the ring 9 and its web 9' which more or less lifts such ring, thereby lifting the gliding surface 9" of the web 9 from the cylinder wall. The amounts of oil passing into the chamber 10 act upon the web 8' of the upper torsion ring 8, pressing the gliding surface of such ring more or less against the cylinder wall. The action is repeated during successive strokes of the piston, thereby filling the chamber 10 with oil. Since the oil accumulated in the chamber 10 cannot escape therefrom, the pressure in such chamber will rise, resulting in firmly pressing the sealing surfaces of the torsion rings into engagement with the cylinder wall. The operation produces within a short time pressures in the chamber 10 acting upon the webs 8 and 9 with such a force that the oil acting on the web 9 from below will not cause lifting of such web from engagement with the cylinder wall; accordingly, no oil or only a very slight amount of oil will seep to the compression ring 6.

It has been found, that pressure may at times prevail in the sealing chamber 10 defined by the torsion rings 8 and 9, so high that the bulbous rear portions of these torsion rings may be lifted from engagement with their annular grooves, thus increasing the pressure engagement of the torsion rings with the cylinder wall. However, since the oil can then escape in back of the annular groove, the pressure in the chamber 10 will drop, thus producing an equilibrium.

As will be seen from Fig. 2, the larger the sealing chamber is, the more oil or sealing fluid can accumulate therein. Since the oil can escape from the sealing chamber 10 responsive to high pressure prevailing therein, there will be obtained a certain flushing resulting in removal of heat produced and absorbed by the oil.

In accordance with another feature of the invention, the pressure in the chamber 10 may be relieved, if desired in some cases, by the provision of small holes formed in the machine part containing sealing chambers, for example, as shown in Fig. 3, by the provision of small holes 12 formed in the piston 2. The size of these holes or bores 12 may be such that the choke effect produced thereby will suffice to allow an increase of pressure in the tightening chamber 10 only up to a predetermined maximum.

A similar effect may be obtained by forming holes in connection with the journal groove for the bulbous rear part of the torsion ring 9, as illustrated in Fig. 4. As soon as the pressure in the sealing chamber increases to a point when the bulbous rear part of the ring 9 is lifted from its seat in the annular groove, the oil will escape through the bore 12'. The torsion ring 9 operates in this case in the manner of a safety valve, opening the bore 12' for the escape of oil only at a predetermined minimum pressure. In this construction, an equilibrium condition may be produced for a predetermined pressure, depending upon the stiffness of the ring 9, the magnitude of play and the bores such as 12', which gives more leeway than in case of the structure according to Fig. 3.

The present invention, providing for two torsion rings cooperatively disposed so as to form with their webs a sealing chamber, is not only adapted for sealing purposes as above described but may be utilized to great advantage for the transmission of energy, for example, for operatively coupling or clutching reciprocating or rotatable machine parts. If care is taken to provide for a sufficiently high fluid pressure, that is, oil or gas pressure in the sealing chamber such as chamber 10, the friction of the torsion rings 8, 9 with respect to the surfaces engaged thereby will become great enough to effect operative coupling between the corresponding parts. It is in this connection immaterial whether the torsion rings forming the sealing chmaber, are disposed peripherally or interiorly with respect to the corresponding machine part.

Fig. 5 shows an example of a structure in accordance with the foregoing explanations. The sealing chamber 10 which may in this case also be referred to as coupling or clutching chamber, containing the torsion rings 8, 9 is formed in a guide bushing 13 serving for receiving a shaft 14 which is longitudinally movable with respect thereto. The guide bushing 13 is provided with bores 15 formed therein which terminate in the sealing or clutching chamber 10. Oil or gas under pressure may be fed through the bores 15 into the clutching chamber 10, thus pressing the torsion rings 8, 9 more or less firmly into engagement with the shaft or rod 14 and consequently coupling the guide bushing 13 operatively with such shaft in the manner of a friction clutch.

The structure according to Fig. 5 may also be used for coupling the parts 13, 14 in case such parts should be rotatably disposed.

It will be seen from the foregoing explanations that a structure according to the invention, comprising two spaced apart torsion rings forming with their angularly mutually inclined tightening webs a sealing chamber, makes it readily possible to seal movable machine parts and also, by controlling the fluid pressure in the sealing chamber, to effect operative coupling of such machine parts. The coupling or clutching according to the invention secures in addition sufficient sealing with respect to the machine parts lying on both sides of the corresponding coupling or clutching means, as is in many cases required or desired.

Changes may be made within the scope and spirit of the appended claims.

We claim:

1. A device for sealing relatively movable machine parts, comprising two torsion rings each having a generally spherically shaped bulbous rear portion and a web extending therefrom having a transversely extending rectilinear outer edge, grooves of generally spherical outline being formed in one machine part for pivotally supporting the spherically shaped bulbous rear portions of the respective torsion rings with the webs thereof extending toward another machine part at converging angles to place said rectilinear outer edges of said webs throughout the extent thereof in engagement with said other machine part, said webs thereby cooperatively defining a sealing chamber therebetween which is adapted to receive a fluid acting thereon to apply pressure thereto resulting in forces transmitted by said webs to the respective pivotally supported bulbous rear portions and torsionally rotating said rear portions correspondingly, whereby said webs are spread apart to bring the rectilinear outer edges thereof into pressure sealing engagement with said other machine part.

2. A device for sealing relatively movable machine parts, comprising two torsion rings each having an annularly shaped bulbous rear portion of generally circular cross-section journalled in a groove formed in one machine part and a web extending from said rear portion toward another machine part, and having a transversely extending outer edge engageable with the latter machine part, the webs of said torsion rings extending at angles and cooperatively defining a sealing chamber therebetween which is adapted to receive a fluid acting on the webs of said torsion rings to apply pressure thereon, said bulbous rear portions each forming a pivotal fulcrum about which resulting torsionally acting forces may rotate the associated web to bring the transversely extending outer edge of the latter into engagement with said other machine part, said first named machine part having bores therein terminating in the groove for journalling the bulbous rear portion of one of said torsion rings, for permitting escape of fluid from said sealing chamber.

3. A device for sealing a relatively movable piston and a cooperable cylinder, comprising two torsion rings each having an annularly shaped bulbous rear portion of generally circular cross-section journalled in a groove formed in the piston and a web extending from said rear portion toward the cylinder, and having a transversely extending outer edge engageable with the cylinder side wall, the webs of said torsion rings extending at angles and cooperatively defining a sealing chamber therebetween which is adapted to receive a fluid acting on the webs of said torsion rings to apply pressure thereon, said bulbous rear portions each forming a pivotal fulcrum about which resulting torsionally acting forces may rotate the associated web to bring the transversely extending outer edge of the latter into pressure engagement with said cylinder side wall, said piston having bores therein terminating in the groove for journalling the bulbous rear portion of one of said torsion rings, for permitting escape of oil from said sealing chamber.

4. A device according to claim 1, wherein a piston constitutes said first named machine part in which the bulbous portions of said torsion rings are journalled and wherein a cylinder for said piston constitutes said second named machine part which is engaged by the webs of said torsion rings.

5. A device according to claim 1, wherein said first named machine part, in which the bulbous portions of said torsion rings are journalled, is provided with bores formed therein terminating in said sealing chamber for the passage of fluid with respect thereto.

6. A device according to claim 4, wherein said piston is provided with bores formed therein terminating in said sealing chamber for the passage of oil with respect thereto.

7. A device according to claim 5, wherein said bores constitute inlet means for a fluid under pressure operative to apply pressure to the webs of said torsion rings whereby said webs exert clamping forces on said relatively movable machine parts operatively clutching said machine parts.

8. A device according to claim 2, wherein said bores constitute inlet means for a fluid under pressure operative to apply pressure to the webs of said torsion rings whereby said webs exert clamping forces on said relatively movable machine parts operatively clutching said machine parts.

References Cited in the file of this patent

UNITED STATES PATENTS

| | | |
|---|---|---|
| 2,615,769 | Barnes et al. | Oct. 28, 1952 |
| 2,753,892 | Deardorff et al. | July 10, 1956 |
| 2,774,619 | Mercier | Dec. 18, 1956 |
| 2,889,183 | Peras | June 2, 1959 |

FOREIGN PATENTS

| | | |
|---|---|---|
| 1,001,068 | Netherlands | Jan. 17, 1957 |